United States Patent [19]
Louvel

[11] Patent Number: 5,930,347
[45] Date of Patent: Jul. 27, 1999

[54] INTERRUPTION OF A CALL BETWEEN TWO TERMINALS BY A CALL FROM ANOTHER TERMINAL

[75] Inventor: Bernard Louvel, Vern-sur-Seiche, France

[73] Assignee: France Telecom, Paris, France

[21] Appl. No.: 08/898,321

[22] Filed: Jul. 22, 1997

[51] Int. Cl.[6] .................................................. H04M 3/42
[52] U.S. Cl. ...................... 379/215; 379/93.35; 379/230; 379/373
[58] Field of Search ..................................... 379/373, 372, 379/229, 230, 231, 234, 235, 255, 93.35, 215, 188, 189, 283, 386, 282, 351

[56] References Cited

U.S. PATENT DOCUMENTS

| | | | |
|---|---|---|---|
| 4,852,151 | 7/1989 | Dittakavi et al. . | |
| 5,263,084 | 11/1993 | Chaput et al. | 379/215 |
| 5,287,401 | 2/1994 | Lin | 379/215 |
| 5,319,702 | 6/1994 | Kitchin et al. | 379/189 |
| 5,406,621 | 4/1995 | Binal | 379/386 |
| 5,450,485 | 9/1995 | Hamilton | 379/377 |
| 5,539,812 | 7/1996 | Kitchin et al. | 379/189 |
| 5,651,060 | 7/1997 | Cohn et al. | 379/93.35 |
| 5,694,466 | 12/1997 | Xie et al. | 379/386 |

FOREIGN PATENT DOCUMENTS

| | | |
|---|---|---|
| 3315884 | 11/1984 | Germany . |
| 2258119 | 1/1993 | United Kingdom . |

OTHER PUBLICATIONS

"The Analog Display Services Interface," by Barry K. Schwartz, IEEL Communications Magazine pp. 70–75, Apr. 1993.

*Primary Examiner*—Scott Wolinsky
*Attorney, Agent, or Firm*—Laubscher & Laubscher

[57] ABSTRACT

A method of interrupting a call established via an analog link between two terminals via a switching center, whether the call is telephonic, telematic or a combination of the two, comprises the transmission of a user alerting signal and a terminal alerting signal from the switching center to one of the terminals. Between these signals the call between the terminals is re-established. To detect the terminal alerting signal the terminal searches during a predetermined period for a pattern transmitted by the switching center comprising in succession a first silence signal with a power less than a predetermined power during a first predetermined period of silence, the terminal alerting signal, and a second silence signal during a second predetermined period of silence.

10 Claims, 8 Drawing Sheets

INTERRUPTION OF A CALL BETWEEN TWO TERMINALS BY A CALL FROM ANOTHER TERMINAL

BACKGROUND OF THE INVENTION

1. Field of the Invention

The present invention concerns the temporary interruption of a call between first and second terminals in order to transmit data to the first terminal via an equipment such as a switching center through which the call between the first and second terminals passes, before re-establishing the call. The data to be transmitted comprises, for example, characters identifying a third terminal calling the first terminal to which the data is addressed.

The present invention is more particularly concerned with a temporary interruption of a call in an analog telephone network.

2. Description of the Prior Art

In a known method, the switching center with serves the first terminal, temporarily interrupts the call between the first and second telephone terminals if the switching center receives a call request signal from the third terminal. The switching center then transmits to the first telephone terminal a user alerting signal such as a signal audible to the user of the first telephone terminal.

The switching center then transmits a terminal alerting signal to the first telephone terminal. The latter, if it is designed to process the terminal alerting signal, responds with an acknowledgment signal. After receiving the acknowledgment signal, the switching center transmits a data message to the telephone terminal concerned and then re-establishes the momentarily interrupted call between the first and second telephone terminals. If the switching center does not receive a acknowledgment signal it re-establishes the call between the first and second telephone terminals.

This known method, which is described in more detail hereinafter with reference to FIG. 2, applies only to the interruption of telephone calls. Telematics calls, or mixed calls successively transmitting speech and data, are disturbed by temporary interruption caused by the known method.

These disturbances are due notably to erroneous recognition of the terminal alerting signal by the first terminal during the call itself, or to failure to detect the terminal alerting signal because it has been disturbed by signals transmitted by the first terminal. These disturbances are also due to the fact that the first terminal or second terminal cannot accept an interruption of sufficient duration.

The consequences of the disturbance include particularly irreversible clearings down of telematics or mixed calls and non-detections and erroneous detections of the temporary interruption.

The switching center cannot distinguish between different types of call to be interrupted and must be able to interrupt any type of call using a single method.

OBJECT OF THE INVENTION

The present invention aims to provide a method of temporarily interrupting a call that is compatible with telematics and mixed calls whilst remaining compatible with telephone calls.

SUMMARY OF THE INVENTION

Accordingly, a method of controlling interruption of a call established via an analog link between first and second terminals via an equipment through which the call passes, which causes the interruption, is implemented in the first terminal. The method is characterized in that it comprises the step of searching during a predetermined search time for a pattern transmitted by the equipment comprising in succession:

a first silence signal during a predetermined first period of silence, a terminal alerting signal transmitted by the equipment, and a second silence signal during a predetermined second period of silence, each of the first and second silence signals having a power less than the lowest power level in the signals exchanged between the first and second terminals within the frequency band of said exchanged signals.

The first and second silence signals remedy any erroneous detection of the terminal alerting signal since the latter is entirely separated from any other signal, and thereby facilitate detection of the terminal alerting signal compared to the prior art technique.

According to a particular embodiment, the interruption control method according which the equipment interrupts the established call to transmit a user alerting signal before the terminal alerting signal, is characterized in that it includes the steps of:
  registering the interruption of the established communication,
  verifying initialization of an intermediate timedelay following the previous step,
  searching during a predetermined period for the user alerting signal transmitted by the equipment if the intermediate time-delay is not initialized,
  searching for a signal modulating a predetermined carrier frequency transmitted by the second terminal during a predetermined period after the searched for user alerting signal has been detected, and
  initializing the intermediate time-delay when the signal modulating the predetermined carrier frequency has been detected and clearing down the established call if the searched for signal modulating the carrier frequency is not detected,
 the step of searching for the pattern being effected only after the loss of the signal modulating the predetermined carrier frequency is registered during the initialized intermediate time-delay.

Accordingly, in this embodiment, the search for the pattern is conditioned by previous reception of the user alerting signal and followed by detection of the signal modulating the predetermined carrier frequency.

According to a variant of embodiment, the interruption control method comprises, before the step of searching for the pattern, the steps of:

receiving a user alerting signal, and initializing a time-delay corresponding to the redetermined search period.

In another aspect of the invention, the interruption control method comprises the step of initializing a disconnection time-delay before the steps of searching for the user alerting signal and searching for the pattern. The disconnection time-delay is a maximum period of loss of the signal modulating the predetermined carrier frequency beyond which the first terminal clears down the established call. After the disconnection time-delay the first terminal re-establishes the call with the second terminal if the signal modulating the predetermined carrier frequency is found and if no user alerting signal and no pattern is detected.

The disconnection time-delay limits the duration of the interruption of the call to a value less than that leading to irreversible clearing down of the call.

Moreover, the interruption control method comprises the step of transmission of an acknowledgment signal by the first terminal when said pattern has been detected in the step of searching for the pattern.

The interruption control method is characterized in that it comprises, in successive after the step of transmitting the acknowledgment signal, the steps of:

searching for a predetermined carrier frequency transmitted by the equipment, receiving a data message transmitted by the equipment if the predetermined carrier frequency is found during a predetermined period, searching for loss of the predetermined carrier frequency during a predetermined period after the message is received, and re-establishing the interrupted call between the first and second terminals as soon as the loss of the predetermined carrier frequency is detected during the predetermined period in the preceding step.

The step of searching for loss of the carrier frequency verifies that data reception has finished so that the call in progress can be re-established.

In variant, the interruption control method comprises, in succession after the step of transmitting the acknowledgment of reception signal, the steps of:

receiving a data message in the form of a series of DTMF codes, detecting silence lasting longer than a predetermined period corresponding to the time between two successive DTMF codes, and re-establishing the interrupted call between the first and second terminals as soon as the silence is detected in the preceding step.

The user alerting signal is preferably a sinusoidal signal at a frequency of 440 Hz and the terminal alerting signal is preferably made up of two sinusoidal signals at frequencies of 2,130 Hz and 2,750 Hz. These signals are readily recognizable by a large number of terminals, in particular telephone terminals. The frequencies of the terminal alerting signal can be in substantially the same frequency band as the signals exchanged between the first and second terminals without this disturbing the interruption process.

The invention also relates to a method executed in an equipment to interrupt temporarily an established call between first and second terminals. The call interruption control method is implemented in an equipment passing through the communication. The method comprises the successive steps of:

interrupting the established call between the first and second terminals, transmitting a user alerting signal from the equipment to the first terminal, transmitting a terminal alerting signal from the equipment to the first terminal, initializing a time-delay to wait for an acknowledgment signal transmitted from the first terminal to the equipment, and re-establishing the call between the first and second terminals after the waiting time-delay if the equipment does not receive the acknowledgment of reception signal or after reception of the acknowledgment signal and transmission of a data message from the equipment to the first terminal.

Accordingly, the call between the first and second terminals is not interrupted for a duration exceeding a limit causing irreversible clearing down of the call.

The call interruption control method comprises the step of:

transmitting a silence signal with a power less than a predetermined power, preferably within the frequency band lying between 1,000 Hz and 3,000 Hz., during first and second predetermined silence periods respectively preceding and succeeding the step of transmitting the terminal alerting signal.

The succession of the silence, terminal alerting and silence signals forms the pattern to be recognized by the terminal.

The method further comprises the step of:

transmitting a silence signal with a power lower than the predetermined power, preferably within the frequency band lying between 1,000 Hz and 3,000 Hz, during a third predetermined period after the transmission of the data message.

Other features and advantages of the present invention will emerge more clearly from a reading of the following description of various preferred embodiments of the invention with reference to the corresponding accompanying drawings in which.

Figure 1:
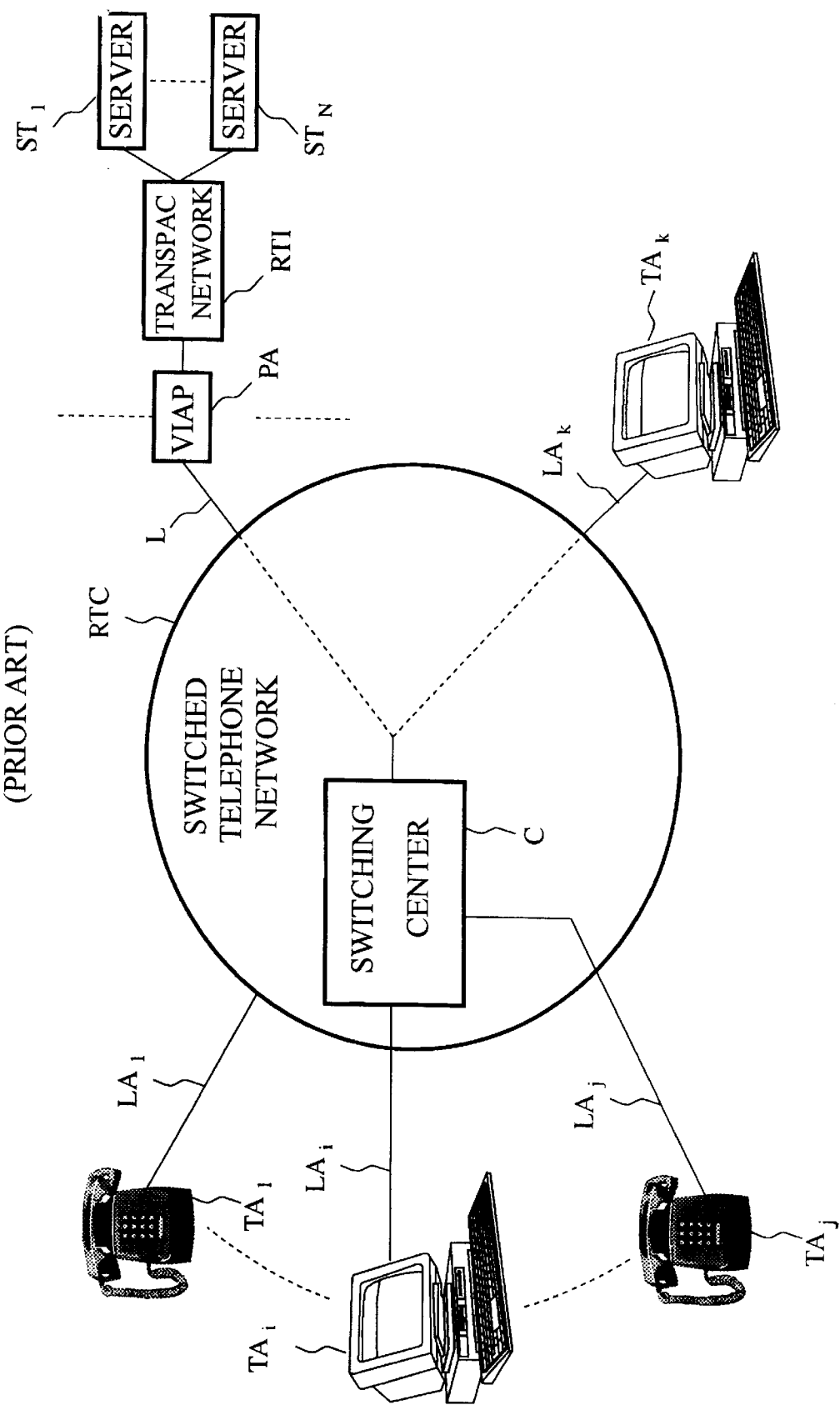
FIG. 1 shows diagrammatically a switched telephone network known in itself.

Referring to FIG. 1, a public or private network RTC connects a plurality of terminals, four of which $TA_1, \ldots, TA_i, TA_j, \ldots, TA_k$ are shown, by respective analog lines $LA_1, \ldots, LA_i, LA_j, \ldots, LA_k$.

The network RTC is the analog public switched telephone network, for example, and includes equipment enabling calls between subscriber terminals. These equipments are particularly switching centers and transmission circuits. In FIG. 1 only one switching center C is shown, that to which the terminals $TA_i$ and $TA_j$ are connected. The invention is also applicable to a private network comprising a PABX exchange, functionally equivalent to the switching center C in the context of the invention, subscriber terminals being also connected to the PABX exchange. Alternatively, the invention applies to terminals connected to two-wire or four-wire dedicated lines on which an equipment is placed in series and through which the call passes.

The subscriber terminals $TA_1$ and $TA_j$ are telephone terminals. The subscriber terminals $TA_i$ and $TA_k$ are data terminals including a modem. For example, the terminals $TA_i$ and $TA_k$ can be videotex terminals such as Minitel (registered trademark) terminals and/or facsimile terminals.

The telephone network RTC is also connected to VIDEOTEX Access Points (VIAP) by telephone lines. A videotex access point PA and a telephone line L are shown in FIG. 1. The access point PA adapts the signals exchanged between the telephone network RTC and a data network RTI such as the TRANSPAC (registered trademark) packet switched network. The network RTI is connected to telematics servers $ST_1$ through $ST_N$.

Calls can be set up between two subscriber terminals compatible therebetween via the switched telephone network. Thus calls include particularly:

calls between two or more telephone terminals;

calls between two videotex terminals;

calls between a videotex terminal and a telematics server via the videotex access point PA; and calls between two facsimile terminals.

The calls pass through the telephone network RTC, to be more precise through at least one switching center such as the switching center C.

It is now assumed that two subscriber terminals are communicating. To make the example more concrete, a call is set up between the telephone terminals $TA_1$ and $TA_j$. This call passes through the switching center C. A third telephone terminal calls the telephone terminal $TA_j$ during the call. The call from the third telephone terminal passes through the switching center C.

Figure 2:
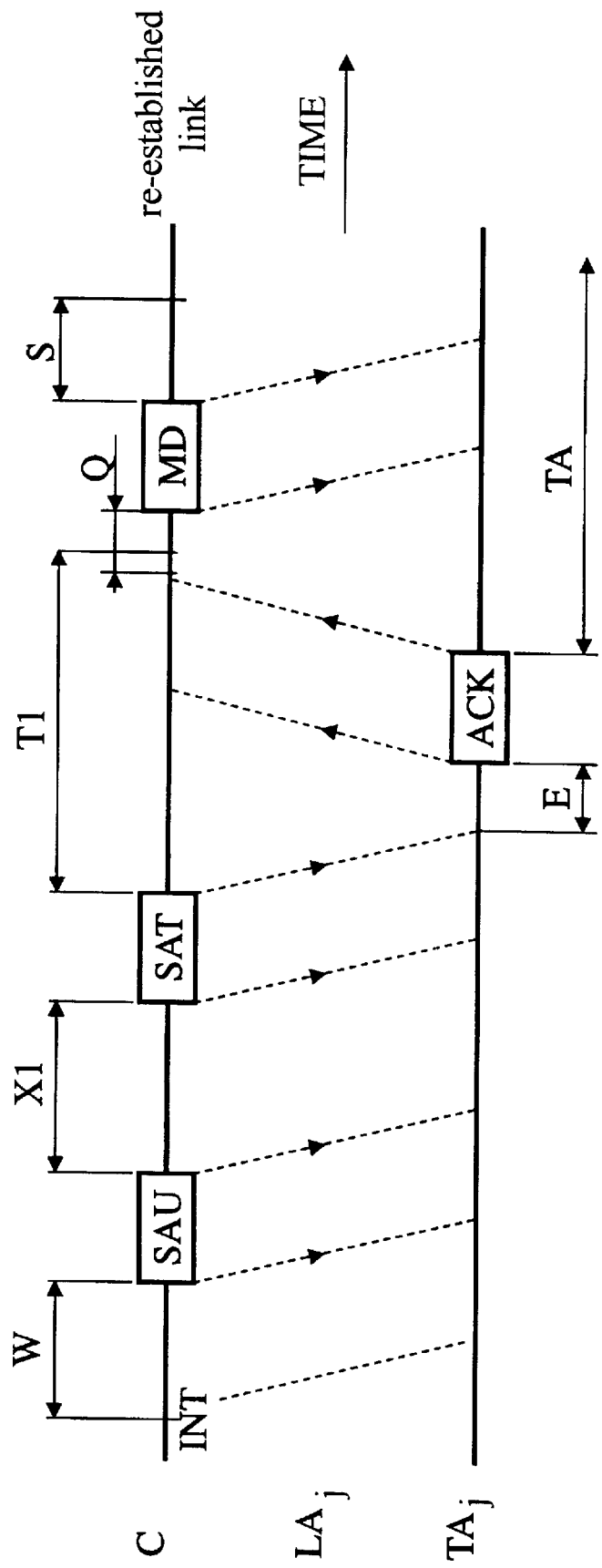
FIG. 2 is a timing diagram of a method known in itself for interrupting a call between a switching center and a telephone terminal of the switched telephone network from FIG. 1.

Referring to FIG. 2, a method known for transmitting data to one telephone terminal $TA_j$, temporarily interrupting the current call between the telephone terminals $TA_1$ and $TA_j$, is used to transmit to the telephone terminal $TA_j$ the identity of the third telephone terminal calling the called telephone terminal $TA_j$.

This method implies interworking between the switching center C and the telephone terminal $TA_j$.

The switching center C instigates an interruption INT of the analog link between telephone terminals $TA_1$ and $TA_j$, whilst retaining the physical link so as not to clear down the call. The telephone terminal $TA_1$ is not directly involved in the process. The telephone terminal $TA_1$ is isolated from the other terminals during the time for the telephone switching center C to transmit the data and is not aware of what is happening during the transmission of the data.

After the interruption INT of the analog link between the telephone terminals $TA_1$ and $TA_j$, the switching center C initiates a time-delay W having a duration of about 55 ms. The time-delay W is a silence period at the end of which the switching center C transmits an audio user alerting signal SAU to the telephone terminal $TA_j$. The user alerting signal is equivalent to a call request signal and is also known as a call waiting indicator. The user alerting signal SAU is a sinusoidal signal at a frequency of about 440 Hz and has a duration lying between 250 ms and 1,000 ms. The user of the telephone terminal $TA_j$ perceives the alerting signal SAU.

After transmitting the user alerting signal SAU, the switching center C transmits a terminal alerting signal SAT made up of two sinusoidal signals whose frequencies are within the upper part of the telephone band, i.e. about 2,130 Hz and 2,750 Hz. The terminal alerting signal SAT has a duration lying between 80 ms and 85 ms. The user alerting signal SAU and the terminal alerting signal SAT are separated by a time-delay X1 the duration of which lies between 0 ms and 50 ms.

After transmitting the terminal alerting signal SAT, the switching center C initializes a time-delay T1 the duration of which is about 160 ms. During the time-delay T1 the switching center C waits for an acknowledgment message ACK transmitted by the telephone terminal $TA_j$.

The telephone terminal $TA_j$ includes a detector circuit for detecting the terminal alerting signal SAT. After detecting the terminal alerting signal SAT, the detector circuit isolates the telephone handset of the telephone terminal $TA_j$, i.e. it isolates the microphone and the earpiece of the handset from the telephone line $LA_j$ so that the telephone terminal user does not hear the tones corresponding to the data transmission, and inhibits any input from the keypad of the terminal $TA_j$. The telephone terminal $TA_j$ transmits to the switching center C the acknowledgment message ACK which is made up of a DTMF code formed of two sinusoidal signals with frequencies equal to 941 Hz and 1,633 Hz. The acknowledgment message ACK has a duration of about 60 ms and is transmitted after a time-delay E between 0 ms and 100 ms initialized by the detector circuit in response to the terminal alerting signal SAT.

After receiving the acknowledgment message ACK during the time-delay T1, the switching center C transmits a data message MD to the telephone terminal $TA_j$ after a wait time Q lying between 0 ms and 500 ms. An additional time-delay S lying between 0 ms and 120 ms is initialized at the end of transmission of the data message MD. At the end of the time-delay S the switching center C re-establishes the analog link between the telephone terminals $TA_1$ and $TA_j$ so that the temporarily interrupted conversation can resume. The interruption time between the interruption INT and the expiry of the time-delay S is 1.2 second maximum, to which must be added the duration of the user alerting signal SAU and the duration of the data message MD transmitted by the switching center C.

After receiving the data message MD, or after a time-delay TA to wait for the data message MD of about 500 ms initialized after the transmission of the acknowledgment message ACK, the telephone terminal $TA_j$ switches the telephone line to the handset, enables input from the keypad and processes the data message MD received, for example by displaying on a screen a message addressed to the user. The message displayed shows the identity of the calling telephone terminal, for example in the form of a name or a telephone number.

As already stated, after the transmission of the terminal alerting signal SAT the switching center C initializes a time-delay T1. If the switching center C does not receive an acknowledgment message ACK during the time-delay T1 the switching center re-establishes the analog link between the telephone terminals $TA_1$ and $TA_j$.

The initial call between the telephone terminals $TA_1$ and $TA_j$ is re-established after the transmission of the data message MD to the telephone terminal $TA_j$ or after the time-delay T1.

The prior art method cannot be used without disturbing the data communication in progress if the subscriber terminals communicating are not telephone terminals, but the data terminals $TA_i$ and $TA_k$, for example (FIG. 1).

Figure 3:
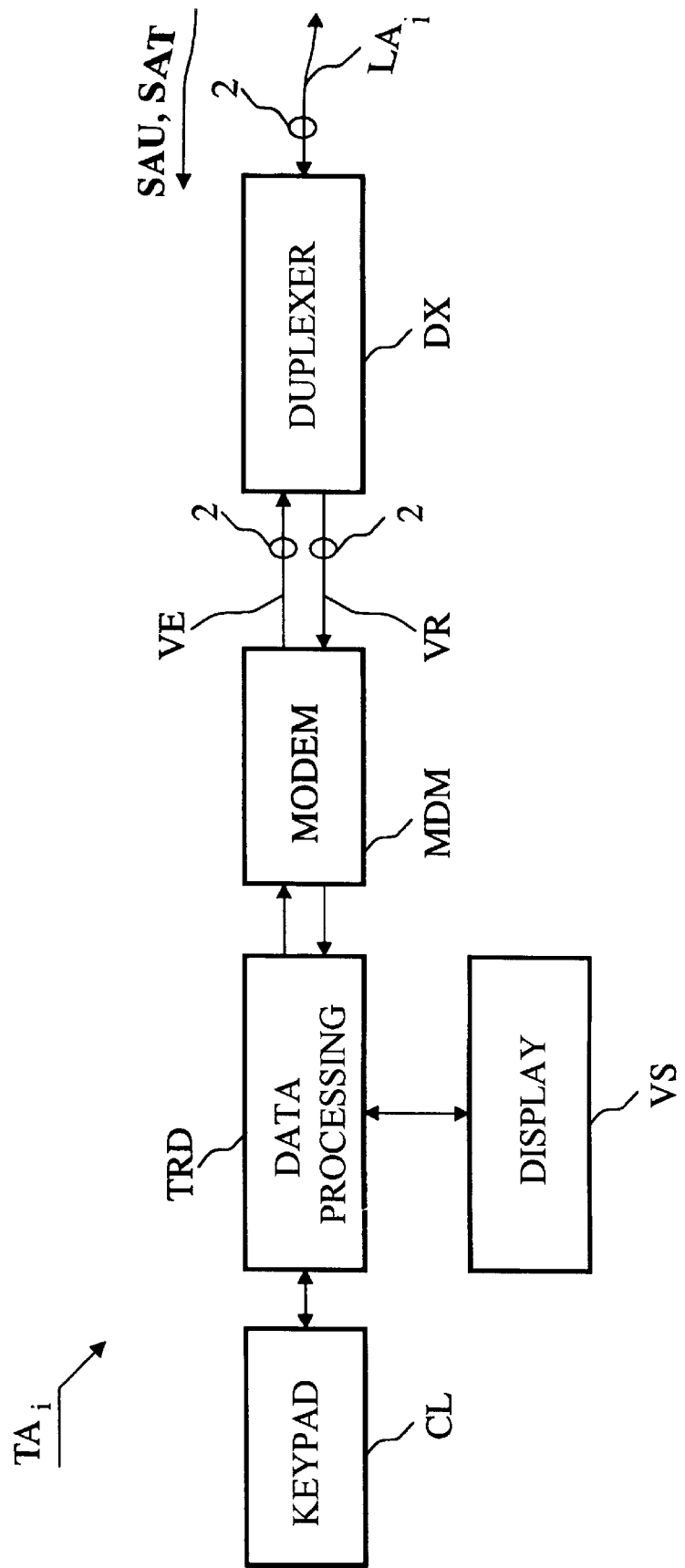
FIG. 3 is a block diagram of a data terminal known in itself connected to the switched telephone network from FIG. 1.

Referring to FIG. 3, the data terminal $TA_i$ is connected to the subscriber telephone line $LA_i$ via a duplexer DX. The duplexer DX is connected to a modem MDM. A data processing circuit TRD is associated with a keypad CL and a display circuit VS for processing data to be transmitted and received via the subscriber telephone line $LA_i$ through the modem MDM.

The terminals able to communicate with each other have analogous structures. In particular their modems can communicate using predetermined protocols and bit rates defined by one of the CCITT Recommendations.

Accordingly, the terminals $TA_i$ and $TA_k$ are Minitel type terminals and communicate with each other via modems operating in accordance with CCITT Recommendation V.23. The call passes through the switching center C.

After the call is set up the terminal $TA_k$ preferably transmits to the terminal $TA_i$ a sequence of characters to indicate that the terminal $TA_k$ accepts loss of the signal transmitted by the terminal $TA_i$ for a period greater than the maximal period necessary for a temporary interruption. This sequence is similar to the videotex "IAN Transpac" sequence and is made up of five bytes coded in hexadecimal in the form 1Bh, 20h, 2Xh, 2Yh, 30h where X and Y are parameters.

The switching center C temporarily interrupts the call in progress between the terminals $TA_i$ and $TA_k$ to transmit data to the terminal $TA_i$ when the latter is a called terminal. As previously, the interruption is caused by a call request from a third data terminal which is seeking to communicate with the terminal $TA_i$, for example.

A first hypothesis is that the terminal $TA_i$ is not designed to receive data during the interruption of a main data call. When the switching center C interrupts the call between the terminals $TA_i$ and $TA_k$, the modem of the terminal $TA_i$, respectively $TA_k$, no longer detects energy in a predetermined band of frequencies of the signal modulating a carrier frequency transmitted from the modem of the terminal $TA_k$, respectively $TA_i$. The switching center C successively transmits to the terminal $TA_i$ the user alerting signal SAU and the terminal alerting signal SAT, as explained with reference to FIG. 2. The called terminal $TA_i$ does not recognize the alerting signals SAU and SAT and does not respond with the acknowledgment message ACK. At the end of the time-delay T1 the switching center C re-establishes the analog link between the terminals $TA_i$ and $TA_k$. The terminals $TA_i$ and $TA_k$ seek to re-establish the call between them.

However, the time for which no transmitted signal is detected from the start of the interruption INT to the expiry of the time-delay T1 is greater than a maximal permissible disconnection time TD set at 430 ms after which non-detection of the transmitted signal causes irreversible clearing down of the link. The call between the terminals $TA_i$ and $TA_k$ is therefore not re-established.

A second hypothesis is that the called terminal $TA_i$ is designed to detect the terminal alerting signal SAT and to receive a data message MD during the interruption of a main data call, i.e. during the interruption of a data signal transmitted from the terminal $TA_k$ to the terminal $TA_i$. At the start of the interruption INT, before the called terminal $TA_i$ detects the signal SAT, the terminal $TA_i$ can continue to transmit to the terminal $TA_k$ a data signal which will be interrupted by the switching center C. The terminal alerting signal SAT is difficult to detect in the data terminal $TA_i$ with a satisfactory success rate. When the subscriber terminal $TA_i$ is designed to transmit and receive data in accordance with one of CCITT Recommendations V.23, V.27 ter and V.29, the data signal transmitted during the main call has a high power at the frequencies of the terminal alerting signal SAT. Because of the inevitable coupling between the transmit and receive channels VE and VR in the duplexer DX of the terminal $TA_i$, some of the data signal transmitted on the transmit channel VE is re-injected into the receive channel VR and disturbs the terminal alerting signal SAT transmitted by the switching center C and this can lead to failure to detect the signal SAT.

Also, the terminal $TA_i$ monitors the reception of a terminal alerting signal SAT without knowing when this signal will be transmitted to it. The frequencies of the terminal alerting signal SAT are in the frequency band of the data signal transmitted by the terminal $TA_k$ and this can lead to erroneous detection of the terminal alerting signal SAT during the main data call.

Erroneous detections of the signal SAT and failures to detect the signal SAT then occur with a too high probability to guarantee the reliability of the process based on the above hypothesis.

Although, with the second hypothesis, the terminal $TA_i$ is designed to receive a data message during a temporary interruption, the terminal $TA_k$ may not accept the loss of the signal transmitted by the terminal $TA_i$ during the period of the temporary interruption. In this case, the call between the terminals $TA_i$ and $TA_k$ is irreversibly cleared down.

Figure 4:
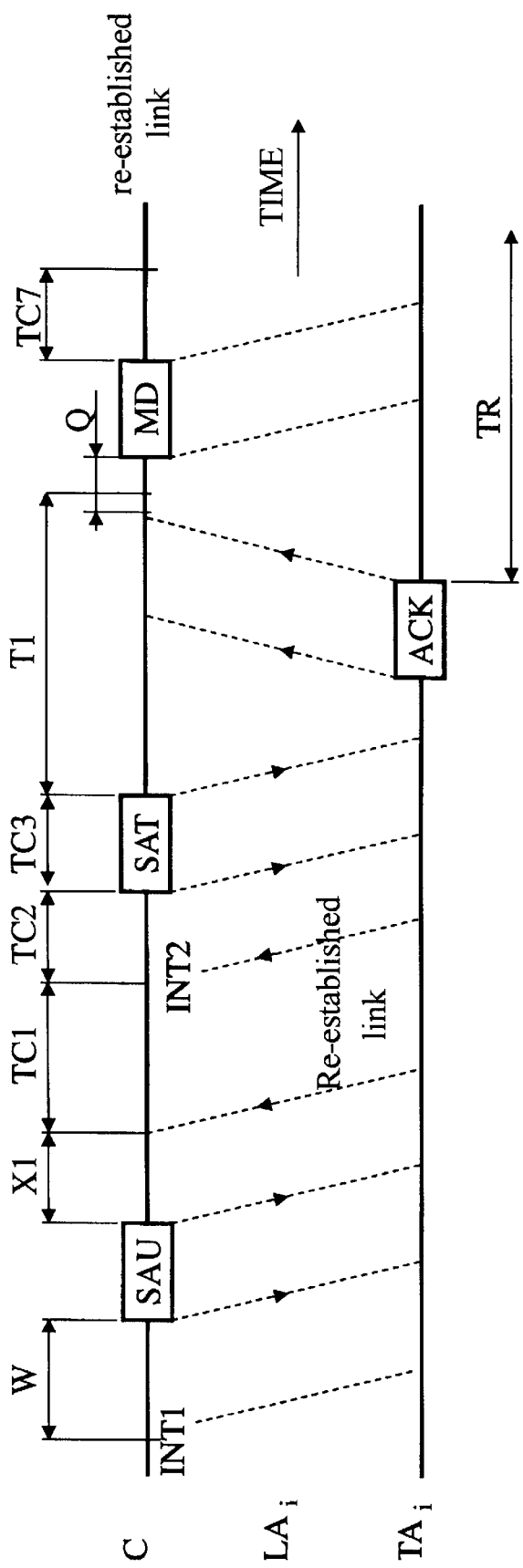
FIG. 4 is a timing diagram of the method of the invention for interrupting a call between a switching center and the data terminal from FIG. 3.

In the method of the invention shown in FIG. 4 the switching center C interrupts the analog link between the terminals $TA_i$ and $TA_k$. The sole aim of this first temporary interruption INT1 is to transmit the user alerting signal SAU. The switching center C initializes the time-delay W, transmits the user alerting signal SAU to the called terminal $TA_i$ and then initializes the time-delay X1.

After the time-delay X1, the switching center C re-establishes the analog link between the terminals $TA_i$ and $TA_k$ during a time-delay TC1 having a duration between about 250 ms and 500 ms. The interruption has a duration less than 430 ms, and corresponds to the sum of the time-delays W and X1 and the duration of the user alerting signal SAU. Thus, for example, the time-delay W lies between about 0 ms and 50 ms, the signal SAU is a sinusoidal signal at a frequency of 440 Hz and has a duration of about 300 ms, and the time-delay X1 lies between about 0 ms and 50 ms. The main data call between the terminals $TA_i$ and $TA_k$ is therefore re-established during the time-delay TC1 since the duration of the loss of the carrier frequency is less than the limit TD set at 430 ms beyond which the terminal $TA_i$ deems the received carrier frequency to be permanently lost and releases the line $LA_i$.

After the time-delay TC1 the switching center C interrupts the analog link between the terminals $TA_i$ and $TA_k$ again. The switching center C initiates a time-delay TC2 having a duration equal to about 110 ms and then transmits the terminal alerting signal SAT to the terminal $TA_i$. The terminal alerting signal SAT is made up of two sinusoidal signals with frequencies equal to about 2,130 Hz and 2,750 Hz. Note that, in accordance with the invention, at least one of these carrier frequencies can be in the frequency band of the signals transmitted between the terminals $TA_i$ and $TA_k$ when the latter are communicating because of the time-delay TC2 following on from the re-establishing of the link during the time-delay TC1 and because of the time-delay T1 following the terminal alerting signal SAT. The duration TC3 of the terminal alerting signal SAT lies between about 80 ms and 85 ms.

After the transmission of the terminal alerting signal SAT the switching center C initializes the time-delay T1 having a duration equal to about 160 ms during which the switching center C waits for the acknowledgment message ACK from the terminal $TA_i$.

After receiving the acknowledgment message ACK the switching center C initializes the time-delay Q which has a duration lying between 0 ms and 100 ms, transmits the data message MD to the terminal $TA_i$ via a modem and then stops the transmission of the carrier frequency from the modem and imposes silence on the line $LA_i$ during a time-delay TC7 lying between about 50 ms and 100 ms. After the time-delay TC7 the switching center C re-establishes the link between the terminals $TA_i$ and $TA_k$.

If the switching center C does not receive the acknowledgment message ACK during the time-delay T1 it re-establishes the analog link between the terminals $TA_i$ and $TA_k$ immediately. In this case, the duration of the second temporary interruption INT2 is TC2+TC3+T1, i.e. about 110+85+160=355 ms, and is therefore less than the maximum disconnection time equal to TD=430 ms accepted by the terminal for clearing down the analog link after the carrier frequency has been absent for too long.

The time-delays TC2, T1 and TC7 are periods of silence during which the signal level on the line $LA_i$ has a power less than the lowest level of the signals exchanged between the terminals $TA_i$ and $TA_k$ communicating in an audible frequency band, preferably between 1,000 Hz and 3,000 Hz. Silence is necessary during the time-delay TC2 for the terminal $TA_i$ to detect the terminal alerting signal SAT regardless of the CCITT recommendation that applies to the call in progress. The silence during the time-delay T1 enables the terminal $TA_i$ to detect the terminal alerting signal SAT more reliably and to resolve the ambiguity between an interruption INT2 and another event, such as interference on the subscriber line or a request to reverse the direction of transmission between the terminals $TA_i$ and $TA_k$, especially during a call set up in accordance with CCITT Recommendation V.23. The silence during the time-delay TC7 enables the call between the terminals $TA_i$ and $TA_k$ to be re-established in the event of erroneous reception of the data message MD.

The method of the invention can also be used when the call to be interrupted temporarily is a telephone call. The switching center C does not know the nature of the call in progress, whether that is a telephone call, a data remote-processing call or a mixed call, i.e. a call comprising speech and data in succession. The method therefore applies to all types of subscriber terminal, subject to only one condition, namely that the subscriber terminal concerned is designed to detect the terminal alerting signal SAT and to respond to it by sending the acknowledgment message ACK. Reference is made hereinafter to a predetermined carrier frequency of 1,300 Hz which corresponds to the binary "1" in messages from the terminals or from the switching center and which is associated with another frequency of 2,100 Hz for modulating the binary "0" of the messages.

Figure 5:
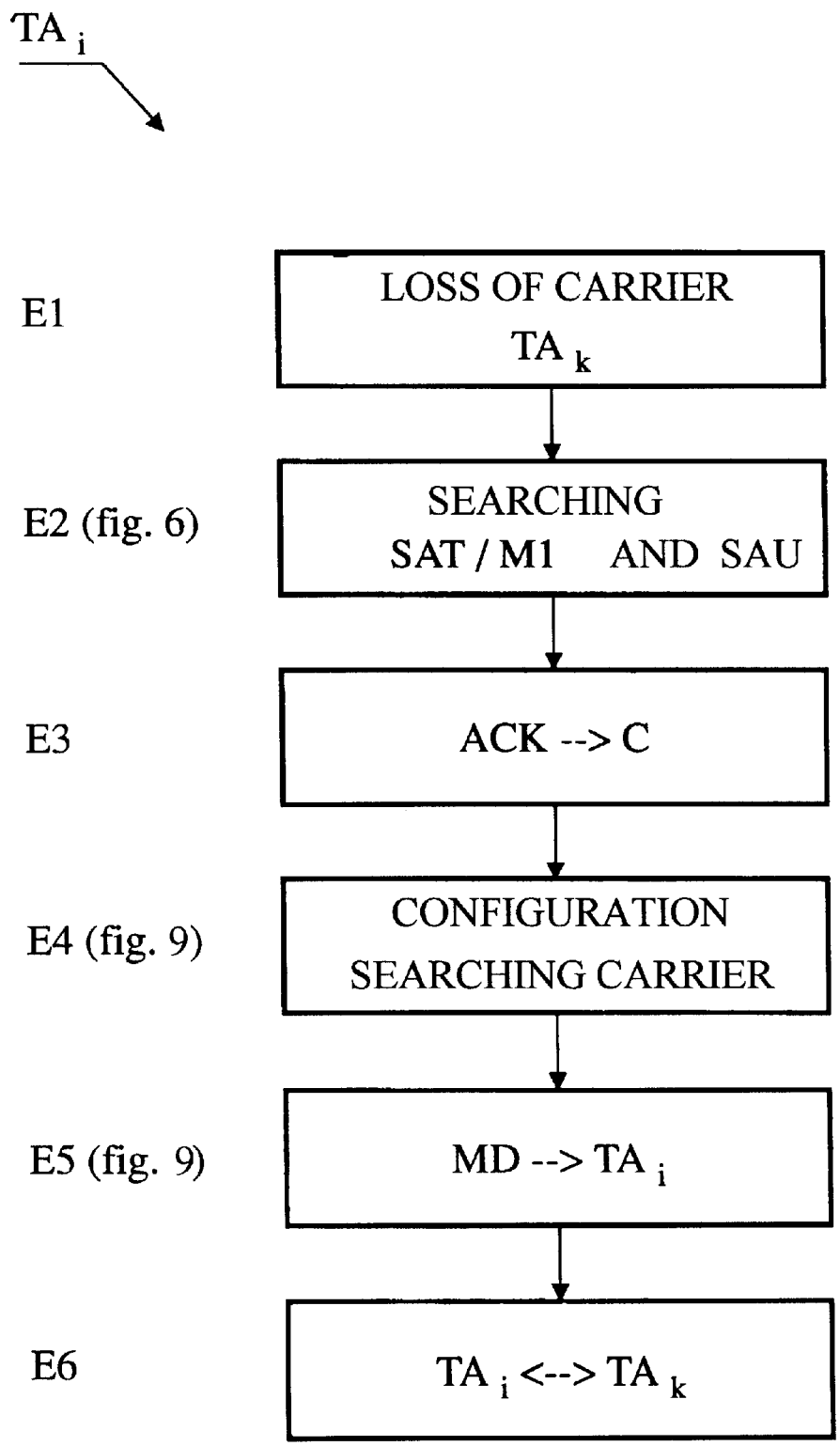
FIG. 5 is a call interruption control algorithm of the invention in the data terminal from FIG. 3.

Referring to FIG. 5, an algorithm for the response of the terminal $TA_i$ to a temporary interruption from the switching center C comprises six steps E1 through E6.

The terminal $TA_i$ is initially communicating with the terminal $TA_k$.

In step E1 the modem MDM of the terminal $TA_i$ registers the loss of the signal modulating the carrier frequency transmitted by the terminal $TA_k$ via the switching center C. Various events can cause the disappearance of the signal modulating the carrier frequency during a call, including:

interference on the network RTC, disconnection of the terminal $TA_k$, a request to interchange the transmission rates for a call set up in accordance with CCITT Recommendation V.23, a "handover" in the case of a half-duplex call, a temporary interruption INT1 or INT2 from the switching center C, as described with reference to FIG. 4.

When the signal modulating the carrier frequency disappears, the terminal $TA_i$ does not know which event caused this and seeks to identify this event.

In step E2 the called terminal $TA_i$ identifies the event that caused the signal modulating the carrier frequency to disappear and seeks the terminal alerting signal SAT and the user alerting signal SAU. The terminal $TA_k$ has previously transmitted to the terminal $TA_i$ the indication signifying that the terminal $TA_k$ accepts the loss of the signal transmitted by the terminal $TA_i$ for a time greater than the maximal time needed for a temporary interruption. If this prior condition is not met the process is interrupted, the terminal $TA_i$ does not seek the terminal alerting signal SAT or the user alerting signal SAU and the call between the terminals $TA_i$ and $TA_k$ is re-established.

The main step E2 comprises seven steps E21 through E27 described in detail with reference to FIG. 6. If the terminal identifies the terminal alerting signal SAT, this signifies that the loss of the signal modulating the carrier frequency is due to a temporary interruption. The terminal $TA_i$ then goes to step E3 in which it transmits the acknowledgment message ACK to the switching center C.

In main step E4 the terminal $TA_i$ configures the modem MDM to receive data with a predetermined bit rate and format corresponding to those used by the switching center C to transmit the data message and then seeks the carrier frequency from the switching center C.

The main step E5 is the reception of the data message MD. The main steps E4 and E5 respectively comprise three steps E41 through E43 and four steps E51 through E54 which are described in detail with reference to FIG. 9. The main step E6 is the re-establishing of the initial data call between the terminal $TA_i$ and the terminal $TA_k$.

For example, the call between the terminals $TA_i$ and $TA_k$ is established in accordance with CCITT Recommendation V.23. The terminal $TA_i$ transmits data at a bit rate of 75 bit/s and receives data at a bit rate of 1,200 bit/s.

Figure 6:
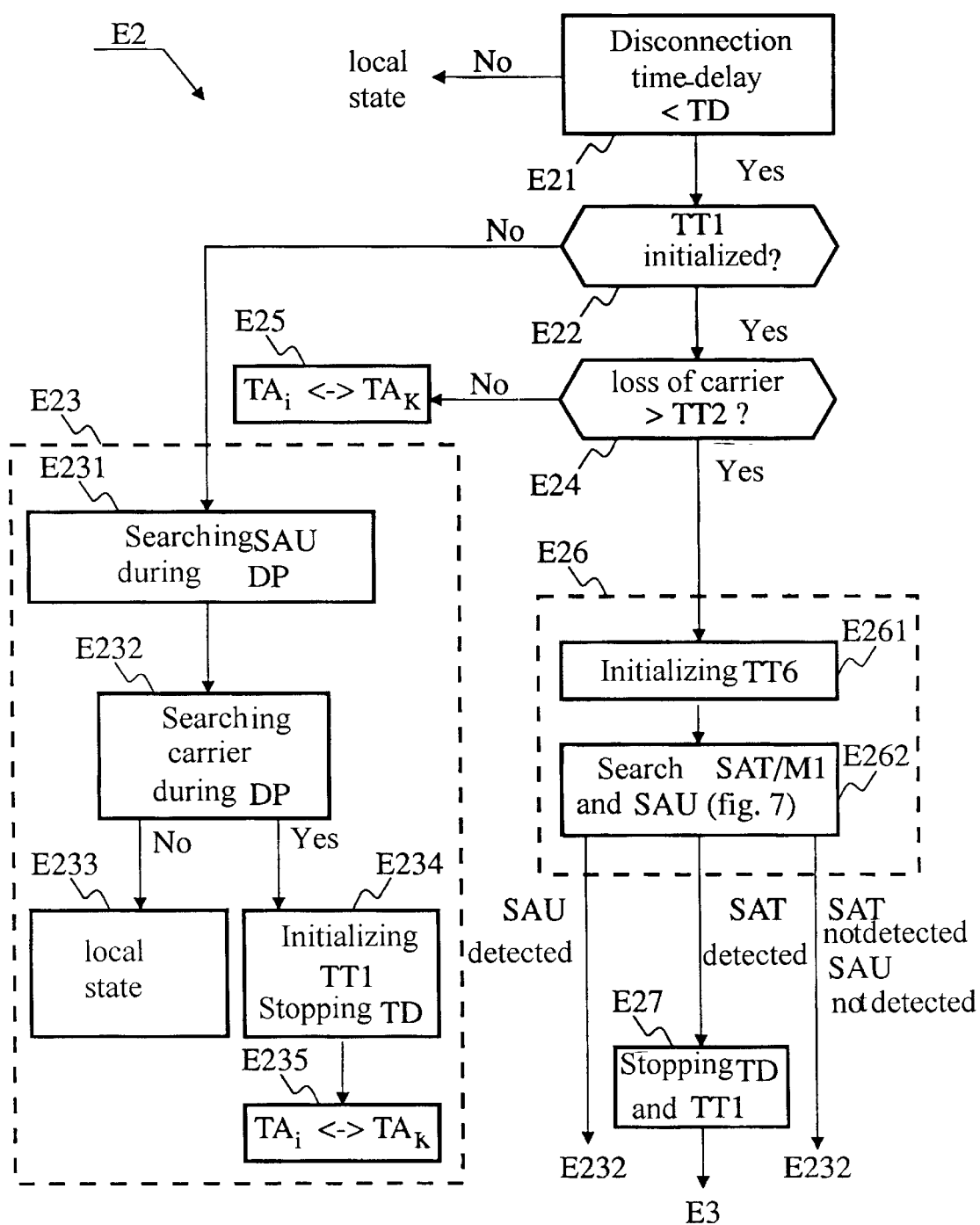
FIG. 6 is a terminal alerting signal search algorithm of the invention.

Referring to FIG. 6, after the disappearance of the signal modulating the carrier frequency from the terminal $TA_k$ (step E1) the terminal $TA_i$ initiates a disconnection time-delay TD equal to 430 ms in step E21. The time-delay TD is the maximal time for which the data call is interrupted without leading to irreversible clearing down of the data call between the terminals $TA_i$ and $TA_k$. If at the end of the disconnection time-delay TD the terminal $TA_i$ has not detected again the signal modulating the carrier frequency from the modem of the terminal $TA_k$, the terminal $TA_i$ goes to the local state, i.e. a state in which it is disconnected from the network.

In the next step E22 the terminal $TA_i$ verifies that an intermediate time-delay TT1 of about 1,000 ms has been initialized previously and is in process.

The intermediate time-delay TT1 is a maximal time between two successive interruptions of a call between the terminals $TA_i$ and $TA_k$. In the case of the temporary interruption, the two interruptions are the interruptions INT1 and INT2 respectively corresponding to the transmission of a user alerting signal SAU and a terminal alerting signal SAT (FIG. 4). The intermediate time-delay TT1 depends on the duration of the time-delay TC1.

If the time-delay TT1 is not initialized, the terminal $TA_i$ goes to step E23 to seek the user alerting signal SAU. Step E23 comprises five sub-steps E231 through E235.

Sub-step E231 is the conventional search for the user alerting signal SAU proper during a time-delay DP1. When the terminal $TA_i$ has detected the user alerting signal SAU, this corresponds to identification of the interruption INT1. In sub-step E232 the terminal $TA_i$ then searches for if the signal modulating the carrier frequency from the terminal $TA_k$, signaling the end of the interruption INT1 is present. If the terminal $TA_i$ does not detect the signal modulating the carrier frequency from the terminal $TA_k$ during a predetermined time DP2 equal to about 20 ms it goes to sub-step E233 in which the modem of the terminal $TA_i$ goes to the local state. Sub-step E233 corresponds to clearing down of the call by the terminal $TA_i$, i.e. the releasing of the line $LA_i$ by the terminal $TA_i$.

If the terminal $TA_i$ detects the signal modulating the carrier frequency from the terminal $TA_k$ in sub-step E232 it goes to sub-step E234 in which the disconnection time-delay TD is stopped and if the terminal $TA_i$ has detected the user alerting signal SAU in sub-step E231 the time-delay TT1 equal to 1,000 ms is initialized. The algorithm then goes to sub-step E235 to resume the call with the terminal $TA_k$.

Reverting to step E22, if the time-delay TT1 has already been initialized (sub-step E234) and is in process, this signifies that the terminal $TA_i$ has received a user alerting signal SAU previously during a call interruption INT1 and that the call interruption corresponding to the disappearance of the signal modulating the carrier frequency that has just been registered in step E1 may correspond to an interruption INT2 for transmitting a data message MD (FIG. 4). The algorithm then goes to step E24 to verify whether the absence of the signal modulating the carrier frequency lasts for at least a minimal verification period TT2 of about 60 ms.

If not, the loss of the signal modulating the carrier frequency from the terminal $TA_k$ is due to interference from the network RTC and the algorithm then goes to step E25 to resume the call with the terminal $TA_k$. Step E25 is analogous to sub-step E235.

If in step E24 the loss of the signal modulating the carrier frequency from the terminal $TA_k$ lasts longer than the time-delay TT2 equal to 60 ms, the terminal alerting signal SAT is searched for in step E26 to identify the interruption INT2. Step E26 includes two sub-steps E261 and E262. The search for the interruption INT2 is conditioned by the prior reception of the user alerting signal SAU. Additionally, prior reception of the user alerting signal SAU must occur within the time-delay TT1 to condition the passage to step E26.

Step E26 comprises simultaneous searches for the terminal alerting signal SAT and a possible further user alerting signal SAU. The switching center C can transmit several user alerting signals SAU in succession before transmitting the terminal alerting signal SAT.

In sub-step E261 the algorithm initializes a time-delay TT6 having a duration of about 260 ms. The time-delay TT6 is a time-delay to wait for the terminal alerting signal SAT. If at the end of the time-delay TT6 the terminal $TA_i$ has not detected the terminal alerting signal SAT or the user alerting signal SAU the algorithm goes to sub-step E232 to re-establish the call with the terminal $TA_k$.

Sub-step E262 is the search for the terminal alerting signal SAT and the user alerting signal SAU simultaneously.

Figure 7:
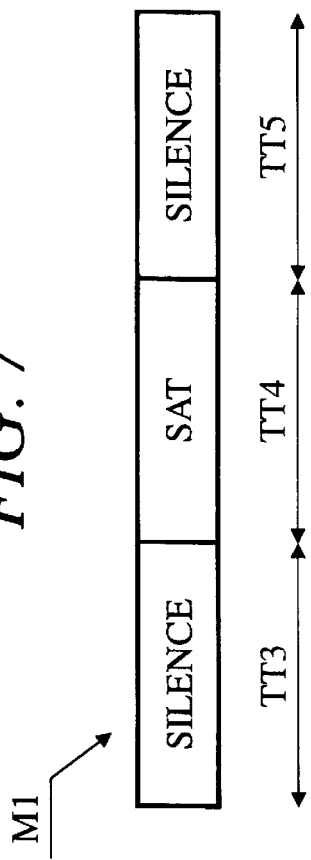
FIG. 7 is a timing diagram of a terminal alerting signal device searched by the algorithm from FIG. 6.

To detect the signal SAT with sufficient reliability the terminal $TA_i$ searches for a pattern M1 shown in FIG. 7 and comprising first, second and third successive signals.

The first signal is a silence having a predetermined duration TT3, for example at least equal to 20 ms. The silence of duration TT3 is caused by the silence TC2 (FIG. 4). In practice the silence of duration TT3 of the pattern M1 can be coincident with the silence of duration TT2 (step E24) which conditions the search for a terminal alerting signal SAT.

The second signal is the terminal alerting signal SAT having a duration TT4 dependent on the duration TC3 of transmission of the signal SAT by the switching center C (FIG. 4).

The third signal is a silence of duration TT5 caused by the start of the silence of duration T1 transmitted by the switching center C. The minimum value of the duration TT5 is about 20 ms.

Each of the silences of duration TT3 and TT5 corresponds to a received signal level having a power less than the lowest level of the signals exchanged between the terminals $TA_i$ and $TA_k$ when they are communicating, in the frequency band between 300 Hz and 3,400 Hz, i.e. a power less than the power of any data signal normally transmitted on the line $LA_i$.

If no terminal alerting signal SAT or user alerting signal SAU has been detected at the end of the time-delay TT6 of step E26, the algorithm goes then to sub-step E232 in order to re-establish the call with the terminal $TA_k$.

If a user signal alert SAU has been detected in step E26, the algorithm goes then to step E232 to detect the signal modulating the carrier frequency from the terminal $TA_k$ and then step E234 to re-initialize the time-delay TT1.

If a terminal alerting signal SAT has been detected in step E26 the algorithm goes to step E27 to stop the disconnection time-delay TD and the time-delay TT1 and then to step E3 already described (FIG. 5).

The algorithm is modified if the terminals $TA_i$ and $TA_k$ are communicating in accordance with CCITT Recommendation V.23, the terminal $TA_i$ receiving at the bit rate of 75 bit/s and transmitting at the bit rate of 1,200 bit/s.

Detection of the terminal alerting signal SAT (step E26) is not conditioned by prior detection of a user alerting signal SAU and the associated initialization of the time-delay TT1 (steps E22 and E23).

In step E1 the modem MDM of the terminal $TA_i$ interrupts the transmission of the data signal to the terminal $TA_k$ as soon as the modem MDM has detected the loss of the signal modulating the carrier frequency from the terminal $TA_k$ to prevent disturbing reception of the terminal alerting signal SAT in the case of the interruption INT2. The terminal alerting signal SAT is detected by the pattern M1 as previously described.

The algorithm is modified if the terminals $TA_i$ and $TA_k$ are communicating in accordance with CCITT Recommendation V.27 ter or V.29.

Figure 8:
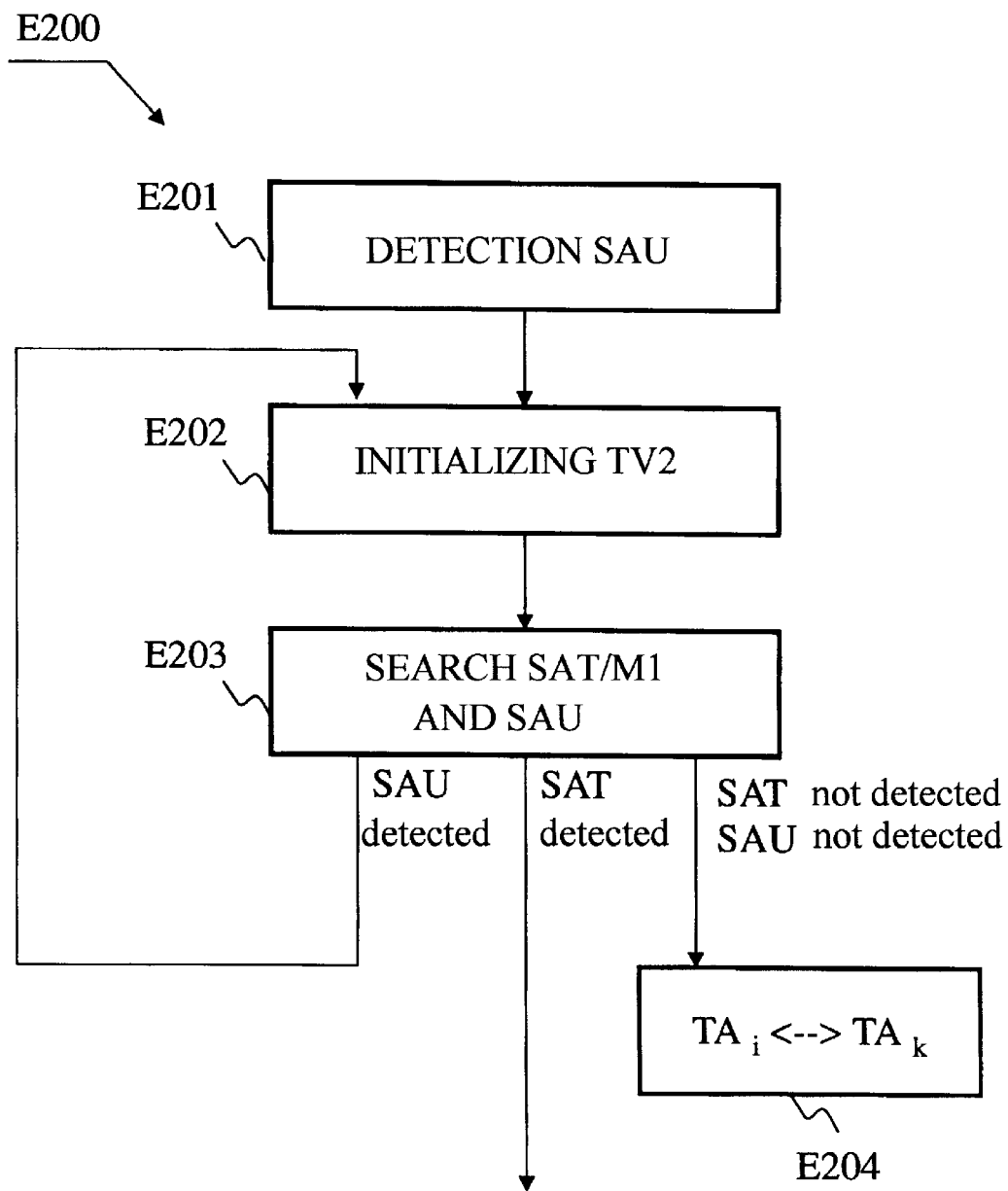
FIG. 8 is a variant of the terminal alerting signal search algorithm from FIG. 6.

The terminal $TA_i$ includes a circuit for detecting the user alerting signal SAU, which circuit searches continuously for the signal SAU as soon as a call is established between the terminals $TA_i$ and $TA_k$. The algorithm does not include step E1 relating to loss of carrier frequency from terminal $TA_k$, and main step E2 is replaced by main step E200 described with reference to FIG. 8.

Main step E200 comprises four steps E201 through E204.

Step E201 is the detection of the user alerting signal SAU, after which the algorithm goes to step E202 to initialize a time-delay TV2 equal to about 1,000 ms during which a terminal alerting signal SAT and any user alerting signal SAU are searched for simultaneously (step E203). The modem MDM of the terminal $TA_i$ interrupts the transmission of the data signal to the terminal $TA_k$ as soon as the detector circuit has detected the user alerting signal to avoid disturbing reception of the terminal alerting signal SAT in the case of the interruption INT2. The terminal alerting signal SAT is detected by the pattern M1 as previously explained.

Like the time-delay TT1, the time-delay TV2 depends on the duration of the time-delay TC1.

If a user alerting signal SAU is detected in step E203 the algorithm returns to step E202 to re-initialize the time-delay TV2.

If a terminal alerting signal SAT is detected in step E203 the algorithm goes to step E3 previously described.

If no terminal alerting signal SAT and no user alerting signal SAU are detected in step E203 during the time-delay TV2 the algorithm goes to step E204 to re-establish the call between the terminals $TA_i$ and $TA_k$.

Figure 9:
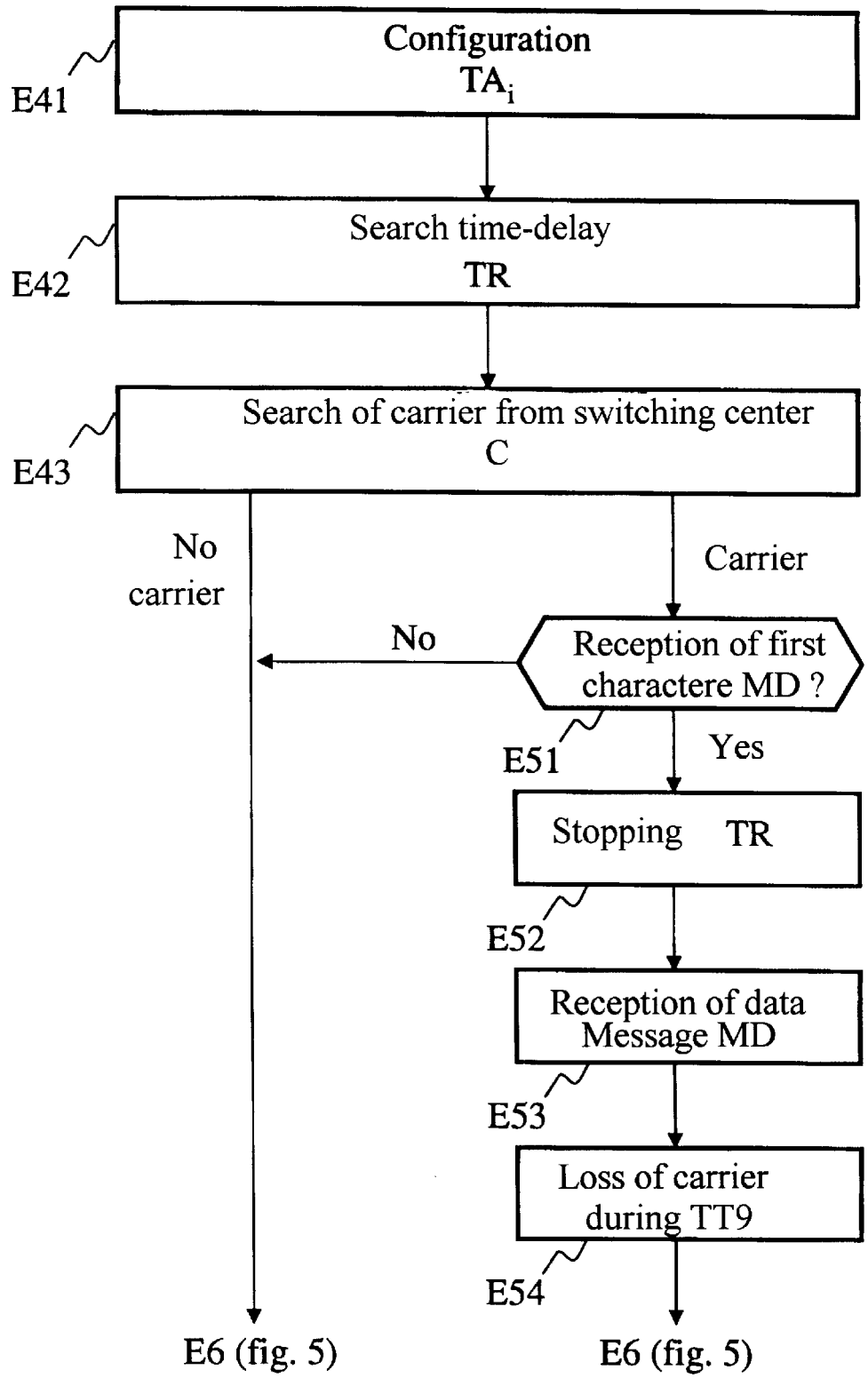
FIG. 9 is an algorithm of communication between the data terminal and the equipment included in the algorithm from FIG. 5.

Referring to FIG. 9, main steps E4 and E5 respectively comprise three sub-steps E41 through E43 and four sub-steps E51 through E54.

For example, step E41 is the configuration of the terminal $TA_i$ to receive the data message MD from the switching center C with a predetermined bit rate and format. The bit rate is 1,200 bit/s and the format is 8 bits with no parity bit and 1 stop bit.

In step E42 the algorithm initializes a search time-delay TR equal to about 380 ms following the transmission of the acknowledgment message ACK. The time-delay TR limits the duration of step E43 of searching for the carrier frequency, typically of 1,300 Hz and corresponding to binary "1", transmitted by the switching center C. If the carrier frequency from the switching center C has not been detected at the end of the time-delay TR, the algorithm goes to step E6.

If in step E43 the carrier frequency from the switching center C is detected during a period equal to about 30 ms, the algorithm then goes to step E51 and waits to receive the first character of the data message MD.

Step E51 prevents blocking if the switching center C interrupts the transmission of the data message MD unexpectedly. If the terminal $TA_i$ does not receive the first character of the data message MD during the time-delay TR, the algorithm then goes to step E6.

When the terminal $TA_i$ receives the first character of the message MD the algorithm goes to step E52 to interrupt the time-delay TR and then to step E53 to receive the data message MD. At the end of reception of the data message MD, the algorithm searches for loss of the carrier frequency from the switching center C during a period TT9 equal to about 40 ms (step E54). The algorithm then goes to step E6.

The period TT9 confirms end of transmission of the data message MD before the call between the terminals $TA_i$ and $TA_k$ is resumed.

Alternatively, the switching center transmits the data message MD to the terminal $TA_i$ in the form of a series of DTMF codes. The terminal $TA_i$ then includes a DTMF code receiver to receive the data message. The DTMF code receiver is connected to the line permanently or after the transmission of the acknowledgment ACK. The terminal $TA_i$ detects the end of the data message MD when it receives silence for longer than a predetermined period corresponding to the maximal period of silence between two successive DTMF codes. After detecting this silence the terminal $TA_i$ re-establishes the call with the terminal $TA_k$.

Alternatively, the data message is an audio message received by a voice recognition circuit included in the terminal $TA_i$.

The terminals $TA_i$ and $TA_k$ preferably use an error correction device. Accordingly, data exchanged between the terminals $TA_i$ and $TA_k$ that would be lost on interruption of the call, regardless of the cause of the interruption, are "repeated" after the call between the terminals $TA_i$ and $TA_k$ resumes.

What I claim is:

1. A method of controlling interruption of a call established via an analog link between first and second terminals via an equipment through which the call passes, said equipment causing the call interruption, said method being implemented in the the first terminal, comprising the step of searching during a predetermined search period for a signal pattern transmitted by the equipment, said signal pattern comprising:

a first silence signal during a predetermined first period of silence, a terminal alerting signal during a predetermined period of alerting, and a second silence signal during a predetermined second period of silence, each of the first and second silence signals having a power less than the lowest power level in any call signals exchanged between the first and second terminals within the frequency band of said any call signals, said first and second silence signals preceding and succeeding the predetermined period of alerting, respectively.

2. The interruption control method according to claim 1 wherein the equipment interrupts the established call to transmit a user alerting signal before the terminal alerting signal, said method comprising the steps of:

registering the interruption of the established call, verifying initialization of an intermediate time-delay following the previous registering step, searching during a predetermined period for the user alerting signal transmitted by the equipment if the intermediate time-delay is not initialized, searching for a signal modulating a predetermined carrier frequency transmitted by the second terminal during a predetermined period after the searched for user alerting signal has been detected, and initializing the intermediate time-delay when the signal modulating the predetermined carrier frequency has been detected and clearing down the established call if the searched for signal modulating the predetermined carrier frequency is not detected, the step of searching for the signal pattern being effected only after the loss of the signal modulating the predetermined carrier frequency is registered during the initialized intermediate time-delay.

3. An interruption control method according to claim 2, characterized in that it comprises the step of initializing a disconnection time-delay before the steps of searching for the user alerting signal and searching for the pattern, said disconnection time-delay being a maximum period of loss of the signal modulating the predetermined carrier frequency beyond which the first terminal clears down the established call, and in that after the disconnection time-delay the first terminal re-establishes the call with the second terminal if the signal modulating the predetermined carrier frequency is found and if no user alerting signal and no pattern is detected.

4. An interruption control method according to claim 1, characterized in that it comprises, before the step of searching for the pattern, the steps of:

receiving a user alerting signal, and initializing a time-delay corresponding to the predetermined search period.

5. An interruption control method according to claim 1, characterized in that it comprises the step of transmitting an acknowledgment signal by the first terminal when said pattern has been detected in the step of searching for the pattern.

6. An interruption control method according to claim 5, characterized in that it comprises, in succession after the step of transmitting the acknowledgment signal, the steps of:

searching for a predetermined carrier frequency transmitted by the equipment, receiving a data message transmitted by the equipment if the predetermined carrier frequency is found during a predetermined period, searching for loss of the predetermined carrier frequency during a predetermined period after the message is received, and re-establishing the interrupted call between the first and second terminals as soon as the loss of the predetermined carrier frequency is detected during the predetermined period in the preceding step.

7. An interruption control method according to claim 5, characterized in that it comprises, in succession after the step of transmitting the acknowledgment signal, the steps of:

receiving a data message in the form of a series of dual-tone multi frequency (DTMF) codes, detecting silence lasting longer than a predetermined period corresponding to the time between two successive DTMF codes, and re-establishing the interrupted call between the first and second terminals as soon as the silence is detected in the preceding step.

8. The interruption control method according to claim 1, characterized in that the terminal alerting signal comprises a sinusoidal signal having a frequency substantially within the frequency band of the signals exchanged between the first and second terminals.

9. A method executed in an equipment to interrupt temporarily an established call via an analog link between first and second terminals passing through said equipment, the first terminal searching during a predetermined search period for a signal pattern transmitted by the equipment, said method executed in said equipment comprising the successive steps of:

interrupting the established call between the first and second terminals, transmitting a user alerting signal from the equipment to the first terminal, establishing the call between the first and second terminals only during a predetermined period, transmitting a terminal alerting signal from the equipment to the first terminal, initializing a time-delay to wait for an acknowledgment signal transmitted from the first terminal to the equipment, and re-establishing the call between the first and second terminals after the waiting time-delay if the equipment does not receive the acknowledgment signal or after reception of the acknowledgment signal and transmission of a data message from the equipment to the first terminal.

10. A method according to claim 9, including the step of:

transmitting a silence signal with a power less than a predetermined power during a predetermined period after transmission of the data message.

* * * * *